(12) United States Patent
Wu

(10) Patent No.: US 12,322,419 B2
(45) Date of Patent: Jun. 3, 2025

(54) SPIN INJECTION ASSISTED MAGNETIC RECORDING

(71) Applicant: Headway Technolobies, Inc., Milpitas, CA (US)

(72) Inventor: Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/359,436

(22) Filed: Jul. 26, 2023

(65) Prior Publication Data

US 2024/0170010 A1 May 23, 2024

Related U.S. Application Data

(62) Division of application No. 17/534,574, filed on Nov. 24, 2021, now Pat. No. 11,756,577, which is a
(Continued)

(51) Int. Cl.
*G11B 5/012* (2006.01)
*G11B 5/02* (2006.01)
(Continued)

(52) U.S. Cl.
CPC .............. *G11B 5/012* (2013.01); *G11B 5/02* (2013.01); *G11B 5/11* (2013.01); *G11B 5/1278* (2013.01);
(Continued)

(58) Field of Classification Search
None
See application file for complete search history.

(56) References Cited

U.S. PATENT DOCUMENTS 6,785,092 B2   8/2004 Covington et al.
6,809,899 B1  10/2004 Chen et al.
(Continued)

FOREIGN PATENT DOCUMENTS

JP   2002-133610   5/2002
JP   2002-298309  10/2002
(Continued)

OTHER PUBLICATIONS

US Notice of Allowance, U.S. Appl. No. 17/534,574, Applicant: Yan Wu, Mail date: May 25, 2023, 9 pages.
(Continued)

*Primary Examiner* — William J Klimowicz
(74) *Attorney, Agent, or Firm* — Salle Ackerman LLC; Stephen B. Ackerman

(57) ABSTRACT

A spin injection assisted magnetic recording structure is disclosed wherein a ferromagnetic (FM) layer and at least one spin preservation (SP) layer are formed between a main pole (MP) trailing side and a write shield (WS). Current (Ia) flows between the MP and WS, or is injected into the FM layer. As a result, the spin polarized electrons from the FM layer, which flow across one or two SP layers to generate a magnetization that enhances one or both of a local WS magnetization and return field, and a local MP magnetization and write field, respectively. A lead to the FM layer may be stitched to enable lower resistance and improve reliability. The FM layer may be recessed from the ABS to allow more overlap with the SP layer for lower current density while maintaining performance. Higher linear density and area density capability, and better reliability are achieved.

8 Claims, 12 Drawing Sheets

Related U.S. Application Data division of application No. 16/593,198, filed on Oct. 4, 2019, now Pat. No. 10,861,084.

(51) Int. Cl.
  *G11B 5/11* (2006.01)
  *G11B 5/127* (2006.01)
  *G11B 5/31* (2006.01)

(52) U.S. Cl.
  CPC .......... *G11B 5/3133* (2013.01); *G11B 5/3146* (2013.01); *G11B 5/315* (2013.01)

(56) References Cited

U.S. PATENT DOCUMENTS

| | | | |
|---|---|---|---|
| 6,954,340 B2 | 10/2005 | Shukh et al. | |
| 7,009,812 B2 | 3/2006 | Hsu et al. | |
| 7,589,600 B2 | 9/2009 | Dimitrov et al. | |
| 7,724,469 B2 | 5/2010 | Gao et al. | |
| 7,835,111 B2 | 11/2010 | Flint | |
| 7,957,098 B2 | 6/2011 | Yamada et al. | |
| 7,963,024 B2 | 6/2011 | Neuhaus | |
| 7,978,442 B2 | 7/2011 | Zhang et al. | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,154,825 B2 | 4/2012 | Takashita et al. | |
| 8,203,389 B1 | 6/2012 | Zhou et al. | |
| 8,264,792 B2 | 9/2012 | Bai et al. | |
| 8,270,112 B2 | 9/2012 | Funayama et al. | |
| 8,295,008 B1 | 10/2012 | Sasaki et al. | |
| 8,310,787 B1 | 11/2012 | Sasaki et al. | |
| 8,320,079 B2 | 11/2012 | Iwasaki et al. | |
| 8,427,781 B1 | 4/2013 | Sasaki et al. | |
| 8,446,690 B2 | 5/2013 | Alex et al. | |
| 8,462,461 B2 | 6/2013 | Braganca et al. | |
| 8,477,452 B2 | 7/2013 | Sasaki et al. | |
| 8,493,687 B2 | 7/2013 | Sasaki et al. | |
| 8,582,240 B1 | 11/2013 | Chen et al. | |
| 8,582,241 B1 | 11/2013 | Yu | |
| 8,604,886 B2 | 12/2013 | Nikonov et al. | |
| 8,634,163 B2 | 1/2014 | Tanabe et al. | |
| 8,749,919 B2 | 6/2014 | Sasaki et al. | |
| 8,767,347 B1 | 7/2014 | Sasaki et al. | |
| 8,792,210 B2 | 7/2014 | de la Fuente et al. | |
| 9,142,228 B2 | 9/2015 | Fujita et al. | |
| 9,230,571 B1 | 1/2016 | Chen et al. | |
| 9,299,367 B1 | 3/2016 | Tang et al. | |
| 9,355,654 B1 | 5/2016 | Mallary | |
| 9,361,912 B1 | 6/2016 | Liu | |
| 9,406,317 B1 | 8/2016 | Tang et al. | |
| 9,466,319 B1 | 10/2016 | Tang et al. | |
| 9,824,701 B2 | 11/2017 | Tang et al. | |
| 9,934,797 B2 | 4/2018 | Takahashi et al. | |
| 9,966,091 B2 | 5/2018 | Chen et al. | |
| 9,978,404 B2 | 5/2018 | Taguchi et al. | |
| 10,014,021 B1 | 7/2018 | Liu | |
| 10,014,465 B1 | 7/2018 | Liu | |
| 10,032,469 B2 | 7/2018 | Lim et al. | |
| 10,032,470 B1 | 7/2018 | Degawa | |
| 10,037,772 B2 | 7/2018 | Okamura et al. | |
| 10,109,302 B1 | 10/2018 | Shinohara | |
| 10,121,497 B1 | 11/2018 | Takahashi et al. | |
| 10,325,618 B1* | 6/2019 | Wu | G11B 5/1278 |
| 10,424,326 B1* | 9/2019 | Chen | G11B 5/3133 |
| 10,446,178 B1 | 10/2019 | Tang | |
| 10,522,174 B1 | 12/2019 | Chen | |
| 10,714,132 B1 | 7/2020 | Chen | |
| 10,937,450 B1* | 3/2021 | Kawasaki | G11B 5/1278 |
| 11,011,193 B1* | 5/2021 | Wu | G11B 5/2455 |
| 11,189,304 B2 | 11/2021 | Wu | |
| 11,568,891 B1* | 1/2023 | Chen | G11B 5/3163 |
| 2002/0034043 A1 | 3/2002 | Okada et al. | |
| 2004/0150910 A1 | 8/2004 | Okada et al. | |
| 2005/0128637 A1 | 6/2005 | Johnston et al. | |
| 2005/0141137 A1 | 6/2005 | Okada et al. | |
| 2006/0044682 A1 | 3/2006 | Le et al. | |
| 2006/0087765 A1 | 4/2006 | Iwakura et al. | |
| 2006/0106978 A1 | 5/2006 | Takano et al. | |
| 2007/0177301 A1 | 8/2007 | Han et al. | |
| 2008/0013209 A1 | 1/2008 | Sasaki et al. | |
| 2008/0088972 A1 | 4/2008 | Sasaki et al. | |
| 2008/0151436 A1 | 6/2008 | Sato | |
| 2009/0059426 A1 | 3/2009 | Sasaki et al. | |
| 2009/0080106 A1 | 3/2009 | Shimizu et al. | |
| 2009/0128953 A1 | 5/2009 | Jiang et al. | |
| 2009/0296275 A1 | 12/2009 | Sasaki et al. | |
| 2010/0165517 A1 | 7/2010 | Araki et al. | |
| 2011/0134561 A1* | 6/2011 | Smith | G11B 5/3133 360/59 |
| 2011/0211271 A1 | 9/2011 | Ng et al. | |
| 2011/0279921 A1 | 11/2011 | Zhang | |
| 2012/0292723 A1 | 11/2012 | Luo et al. | |
| 2012/0307404 A1 | 12/2012 | Braganca et al. | |
| 2013/0062308 A1 | 3/2013 | Funayama et al. | |
| 2014/0071562 A1 | 3/2014 | Chen et al. | |
| 2014/0177092 A1 | 6/2014 | Katada et al. | |
| 2015/0043106 A1 | 2/2015 | Yamada et al. | |
| 2015/0092301 A1 | 4/2015 | Fujita | |
| 2015/0380022 A1 | 12/2015 | Koui | |
| 2016/0218728 A1 | 7/2016 | Zhu | |
| 2017/0133044 A1 | 5/2017 | Lim et al. | |
| 2017/0186450 A1 | 6/2017 | Yamada | |
| 2017/0263272 A1 | 9/2017 | Funayama | |
| 2017/0309301 A1 | 10/2017 | Takahashi | |
| 2018/0075868 A1 | 3/2018 | Koui et al. | |
| 2019/0244635 A1 | 8/2019 | Goncharov | |
| 2020/0152228 A1* | 5/2020 | Tang | G11B 5/232 |
| 2020/0312354 A1* | 10/2020 | Wu | G11B 5/3143 |
| 2021/0012794 A1 | 1/2021 | Tang | |
| 2021/0056987 A1* | 2/2021 | Wu | G11B 5/3146 |
| 2021/0074318 A1* | 3/2021 | Wu | G11B 5/3133 |
| 2021/0233559 A1 | 7/2021 | Le | |
| 2021/0233560 A1 | 7/2021 | Freitag | |
| 2024/0135966 A1* | 4/2024 | Asif Bashir | G11B 5/314 |
| 2024/0144962 A1* | 5/2024 | Asif Bashir | G11B 5/1278 |
| 2024/0144963 A1* | 5/2024 | Asif Bashir | G11B 5/3116 |

FOREIGN PATENT DOCUMENTS

| | | |
|---|---|---|
| JP | 2008-021398 | 1/2008 |
| JP | 2010-157303 | 7/2010 |

OTHER PUBLICATIONS

US Office Action, U.S. Appl. No. 17/534,574, Applicant: Yan Wu, Mail date: Feb. 3, 2023, 9 pages.

US Notice of Allowance, U.S. Appl. No. 16/563,198, Applicant: Wu, Mail date: Aug. 4, 2021, 7 pages.

US Office Action, U.S. Appl. No. 16/546,387, Applicant: Wu, Mail date: Aug. 17, 2020, 24 pages.

US Office Action, U.S. Appl. No. 16/563,198, Applicant: Wu, Mail date: Nov. 17, 2020, 13 pages.

US Office Action, U.S. Appl. No. 16/563,198, Applicant: Wu, Mail date: Jun. 9, 2020, 15 pages.

"High-Power Coherent Microwave Emission from Magnetic Tunnel Junction Nano-oscillators with Perpendicular Anisotropy," by Zhongming Zeng, et al., 2012 American Chemical Society, Jun. 4, 2012, vol. 6, No. 7, pp. 6115-6121.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

Nov. 13, 2012, Office Action issued in Japanese Patent Application No. 2011-149244.

Nov. 13, 2012, Office Action issued in Japanese Patent Application No. 2011-149243.

US Notice of Allowance, U.S. Appl. No. 16/037,197, Applicant: Wu et al., Mail date: Mar. 4, 2019, 8 pages.

(56) References Cited

OTHER PUBLICATIONS

US Notice of Allowance, U.S. Appl. No. 16/197,586, Applicant: Chen et al., Mail date: May 15, 2019, 16 pages.
PTO Office Action, U.S. Appl. No. 12/964,202, Applicant: Sasaki et al., Notification date: Nov. 28, 2012, 11 pages.
"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.
Microwave Assisted Magnetic Recording, by Jian-Gang Zhu et al., IEEE Transactions on Magnetics, vol. 44, No. 1, Jan. 1, 2008, pp. 125-131.
Nov. 13, 2012, Office Action issued in Japanese Patent Application No. 2011-149242.
US Notice of Allowance, U.S. Appl. No. 17/534,574, Applicant: Wu, Mail date: May 25, 2023, 9 pages.

\* cited by examiner

SPIN INJECTION ASSISTED MAGNETIC RECORDING

This is a divisional application of U.S. patent application Ser. No. 17/534,574 filed on Nov. 24, 2021 and now issued as U.S. Pat. No. 11,756,577, which is a divisional application of U.S. patent application Ser. No. 16/563,198; filed on Sep. 6, 2019, and now issued as U.S. Pat. No. 11,189,304, both assigned to a common assignee, and herein incorporated by reference in their entirety.

RELATED PATENT APPLICATIONS

This application is related to the following: U.S. Pat. Nos. 10,325,618; and 10,424,326; assigned to a common assignee, and herein incorporated by reference in their entirety.

TECHNICAL FIELD

The present disclosure relates to a design for a spin injection assisted magnetic recording structure wherein a ferromagnetic (FM) layer adjoins one or two spin preserving (SP) layers in a write gap (WG), and a current is injected across the FM layer and at least one SP layer, and into one or both of a main pole (MP) and write shield (WS) to improve a local magnetic field and field gradient at one or both of a MP/WG interface and a WG/WS interface, respectively, thereby increasing linear density capability and area density capability (ADC) for perpendicular magnetic recording (PMR) applications.

BACKGROUND

As the data areal density in hard disk drive (HDD) writing increases, write heads and media bits are both required to be made in smaller sizes. However, as the write head size shrinks, its writability degrades. In particular, perpendicular magnetic recording (PMR) performance is limited by the saturation magnetization (Ms) of available magnetic materials. To improve writability, new technology is being developed that assists writing to a media bit. Two main approaches currently being investigated are thermally assisted magnetic recording (TAMR) and microwave assisted magnetic recording (MAMR). The latter is described by J-G. Zhu et al. in "Microwave Assisted Magnetic Recording", IEEE Trans. Magn., vol. 44, pp. 125-131 (2008). MAMR uses a spin torque device to generate a high frequency field that reduces the coercive field of a medium bit thereby allowing the bit to be switched with a lower main pole field. A third approach called STRAMR (spin torque reversal assisted magnetic recording) relies on spin torque to reverse a magnetization in a flux generating layer (FGL) in the write gap to increase reluctance and force more magnetic flux from the MP at the ABS. STRAMR is described in U.S. Pat. No. 6,785,092.

Spin transfer (spin torque) devices are based on a spin-transfer effect that arises from the spin dependent electron transport properties of ferromagnetic-spacer-ferromagnetic multilayers. When a spin-polarized current passes through a FM1/NM/FM2 multilayer in a CPP (current perpendicular to plane) configuration where FM1 and FM2 are first and second FM layers and NM is a non-magnetic spacer, the spin angular moment of electrons from FM1 that is incident on FM2 interacts with magnetic moments of FM2 near the NM/FM2 interface. Through this interaction, the electrons transfer a portion of their angular momentum to FM2. As a result, spin-polarized current can switch the FM2 magnetization direction or enhance FM2 magnetization depending on the current density. Spin transfer devices are also known as spintronic devices and may have ferromagnetic (FM) layers with a perpendicular magnetic anisotropy (PMA) component where magnetization is aligned substantially perpendicular to the plane of the FM layer. These devices have an advantage over devices based on in-plane anisotropy in that they can satisfy the thermal stability requirement but also have less limits on cell aspect ratio. As a result, spintronic structures based on PMA are capable of scaling for higher packing density, which is a key challenge for future MRAM (Magnetoresistive Random Access Memory) and spin torque transfer (STT)-MRAM applications, and for other spintronic devices such as microwave generators and assist structures for PMR.

Related U.S. Pat. No. 10,424,326 discloses a magnetic flux guiding device that is a STRAMR approach. STRAMR devices typically require a high current density to flip a magnetization in a FM layer in the WG, and this issue is substantially overcome by placing spin polarization (SP) layers on each side of the FM layer so that an additive spin torque on the FM layer magnetization is generated to allow a reduced current density. However, a new assist design is desired that does not rely on spin flipping to enhance the write field, and has flexibility in increasing one or both of a local magnetic field and field gradient at the main pole/WG interface and at the WG/write shield interface thereby improving linear density and areal density capability.

SUMMARY

One objective of the present disclosure is to provide a PMR writer wherein a spin injection assisted magnetic recording (SIAMR) device is formed in a write gap (WG) and enables spin polarized electrons to flow into one or both of a write shield at a SIAMR/WS interface and into a MP at a MP/SIAMR interface thereby enhancing the return field and write field, respectively, to improve linear density and ADC.

A second objective of the present disclosure is to provide a SIAMR device according to the first objective that also provides improved reliability compared with conventional PMR writers with MAMR capability.

According to one embodiment of the present invention, these objectives are achieved with a PMR writer design wherein a SIAMR device comprises a FM layer and at least one adjoining spin preserving (SP) layer in the WG between a MP and a WS. In a first embodiment, the SIAMR device further includes a pair of so-called spin killing layers made of Ta, W, Pt, Ru, Ti, or Ir on a side of the FM layer that is opposite to the FM side that adjoins the SP layer. The SP layer contacts the WS, and applied current flows from the MP to WS so that spin polarized electrons from the FM layer provide a magnetization that enhances a local WS field proximate to the SP/WS interface and a return field in the WS. In an alternative embodiment, when the SP layer contacts the MP and applied current ($I_a$) flows from the WS through the FM layer and SP layer into the MP, $I_a$ produces a magnetization that enhances a local MP field proximate to the MP/SP interface, and the write field. There are leads from the MP and WS that are connected to a direct current (dc) source to enable $I_a$ to be applied across the SIAMR device during a write process.

According to a second embodiment, the features of the first embodiment are retained except the spin killing layers are replaced with a dielectric (WG) layer, and $I_a$ is applied through a lead to the FM layer and across the SP layer to the WS. In both of the first and second embodiments, each of the FM and SP layers has a front side at the air bearing surface (ABS), and the SP layer has a backside at a WS throat height (TH). A backside of the FM layer is typically at a height substantially greater than the WS TH in the second embodiment. The FM layer may be a single layer or multilayer that is comprised of one or more of Fe, Co, CoFe, NiFe, CoFeNi, and alloys thereof such as CoB, FeB, CoFeB, and CoFeNiB, or alloys with one or more of Ta, Zr, and Cr such as CoTaZr. The SP layer is a material comprised of one or more of Cu, Au, Ag, Ru, Cr, and Al while the dielectric (WG) layer may be an oxide or nitride of Al, Mg, Si, Ti, Ta, Hf, or Zr.

A third embodiment retains all the features of the second embodiment except the backside of the SP layer is extended to a height greater than the WS TH to enable greater current density in the spin polarized current through the SP layer.

According to a fourth embodiment that is a modification of the third embodiment, a front side of the FM layer is recessed to the WS TH, for example, to allow lower current density between the FM and SP layers because greater overlap of the two layers is possible in the cross-track direction outside the tight confines of the WG proximate to the ABS. Therefore, improved reliability is expected since lower current density means lower risk of electromigration of metals sir alloys within the FM and SP layers.

In a fifth embodiment, the dielectric layer adjoining one side of the FM layer in the fourth embodiment is replaced with a first SP layer (SP1) such that spin polarized current from the FM layer flows through SP1 to the MP and through a second SP layer (SP2) to the WS to enhance localized MP and localized WS magnetization, respectively, thereby improving the write field and return field. Optionally, one or both of the FM layer front side is at the ABS, and the SP1 and SP2 backsides are at the WS TH.

According to a sixth embodiment, any of the second through fifth embodiments is modified to use a stitched lead between the dc source and the FM layer. Thus, a back portion of the FM layer may be stitched to a SP material or to a spin killing material. As a result, the lead resistance is lowered, which in turn reduces operating temperature to improve reliability.

In the seventh embodiment, the FM layer in the second embodiment is omitted and the SP layer adjoins both of the WS and MP so that when $I_a$ is applied from the MP to the WS, a portion of the MP proximate to the MP/SP interface serves as the FM layer, which spin polarizes $I_a$. A first portion of the SP layer proximate to the MP trailing side is preferably recessed beyond the WS TH to avoid reducing MP magnetization proximate to the ABS, and a second portion of the SP layer adjoining the WS has a front side at the ABS, and a backside at the same height as the first portion.

A process sequence is also provided for forming a SIAMR stack of layers according to an embodiment of the present disclosure.

BRIEF DESCRIPTION OF THE DRAWINGS

FIGS. 13A, 14A, 16A-18A and FIGS. 19-21 are ABS views that depict a sequence of steps in forming a SIAMR stack of layers between a MP trailing side and a WS according to an embodiment of the present disclosure.

FIG. 19 is a cross-sectional view showing the partially formed structure in FIG. 18A after an etch process is used to pattern the SP layer to give a constant width w, and a write gap (WG) adjoining the SP layer is deposited to a thickness t.

FIG. 20 is a cross-sectional view showing the partially formed structure in FIG. 19 after rite shield (WS) is deposited on the WG, and a photoresist mask is patterned to expose a portion of the WS top surface.

FIG. 21 is a cross-sectional view of the partially formed structure in FIG. 20 after an etch process is used to remove exposed portions of the WS and WG and stops on the side shields, and a second top shield (TS) is formed on exposed regions of the side shield top surface, and above remaining portions of the WS top surface.

DETAILED DESCRIPTION

Figure 1:
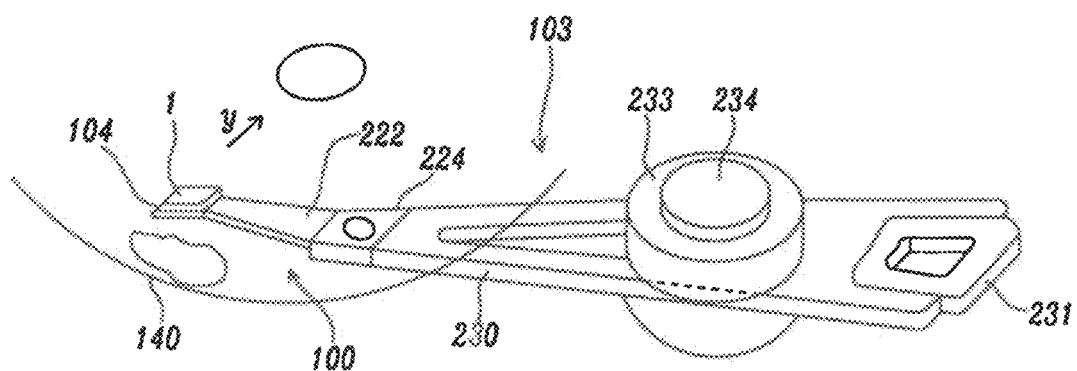
FIG. 1 is a perspective view of a head arm assembly of the present disclosure.

The present disclosure is a PMR writer with a SIAMR design wherein spin polarized current is injected into a FM layer and then across at least one SP layer in a WG before entering a main pole or a write shield in order to improve linear density, reliability, and ADC. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance from the ABS in the x-axis direction. The terms "downward" and "upward" when referring to write field and return field directional arrows in the drawings indicate a direction that is into the ABS and toward a back end of the PMR writer for "upward", and out of the ABS and toward a magnetic medium for "downward". The terms "MP field" and "write field" may be used interchangeably. Although the exemplary embodiments depict a single PMR writer, the present disclosure anticipates that two or more PMR writers may be formed on a slider and each of the PMR writers comprises a SIAMR device described herein.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
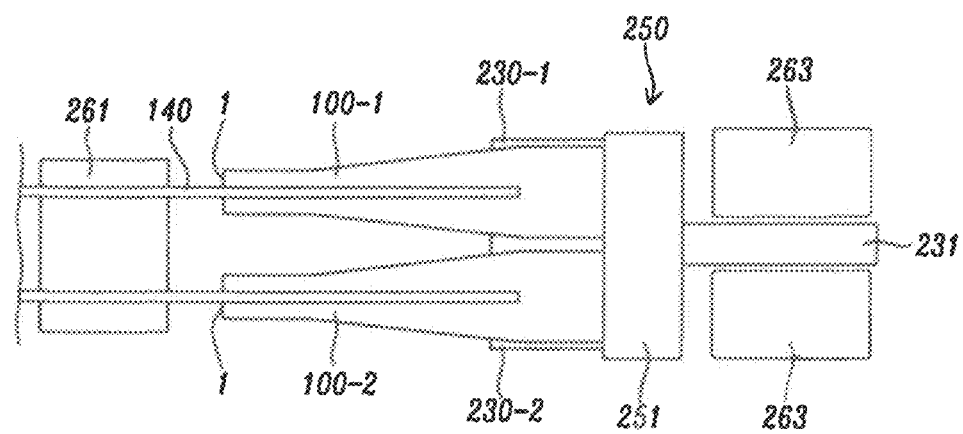
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 1001 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
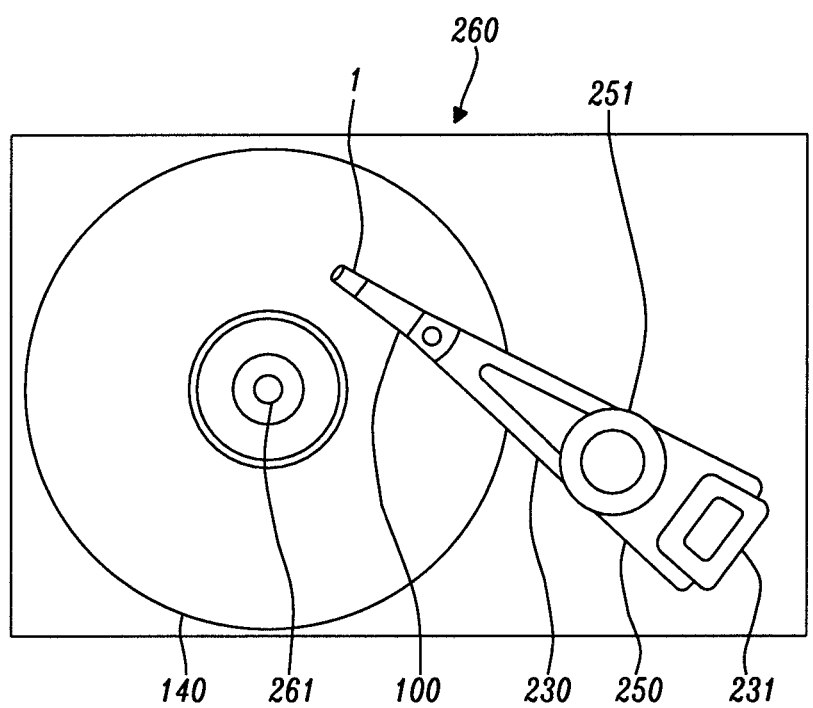
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
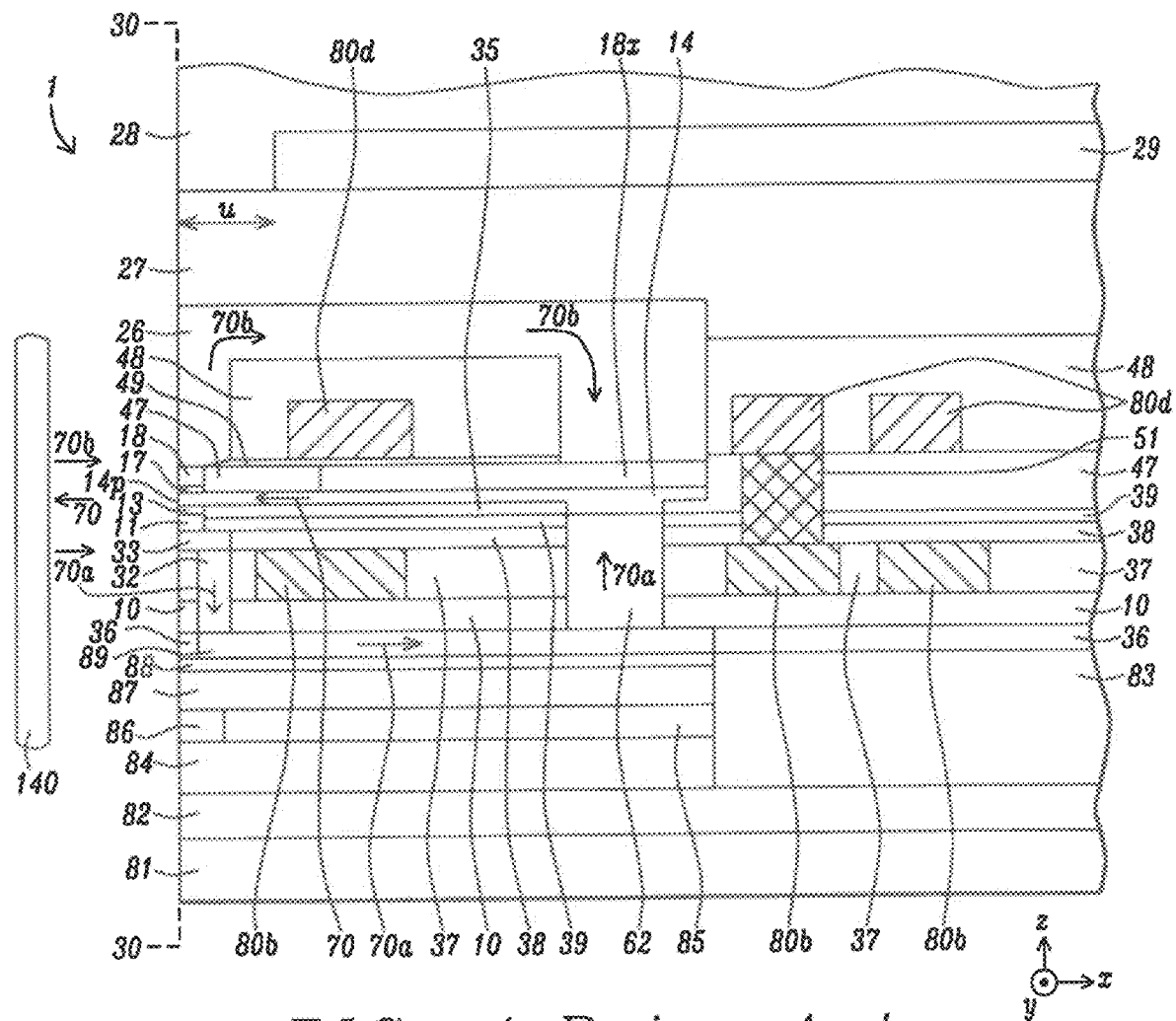
FIG. 4 is a down-track cross-sectional view of a combined read-write head with leading and trailing loop pathways for magnetic flux return to the main pole in the PMR writer according to an embodiment of the present disclosure.

Referring to FIG. 4, magnetic recording head 1 comprises a combined read-write head. The down-track cross-sectional view is taken along a center plane (44-44 in FIG. 5) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux known as write field 70 in main pole (MP) layer 14 is generated with flowing a write current (1w) through bucking coil 80b and driving coil 80d that are below and above the MP layer, respectively, and are connected by interconnect 51. Magnetic flux 70 exits the MP layer at pole tip 14p at the ABS 30-30 and is used to write a plurality of bits on magnetic media 140. Magnetic flux 70b returns to the MP through a trailing loop comprised of trailing shields 17, 18, PP3 shield 26, and top yoke 18x. There is also a leading return loop for magnetic flux 70a that includes leading shield 11, leading shield connector (LSC) 33, S2 connector (S2C) 32, return path 89, and back gap connection (BGC) 62. The magnetic core may also comprise a bottom yoke 35 below the MP layer. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5:
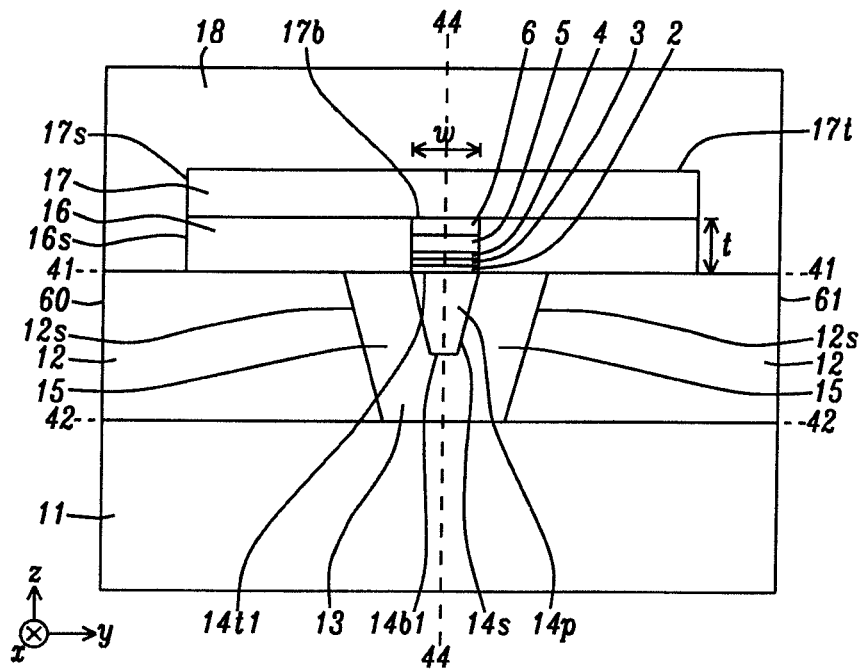
FIG. 5 is an ABS view of a SIAMR device according to a first embodiment of the present disclosure wherein a stack comprised of two spin killing layers, a FM layer, and a SP layer are formed on a MP trailing side and in a WG such that the SP layer adjoins a WS bottom surface.

Referring to FIG. 5, an ABS view is depicted of the PMR writer in FIG. 4 according to an embodiment of the present disclosure. The main pole (MP) has a MP tip 14p with track width w, trailing side 14t1, leading side 14b1, and two sides 14s formed equidistant from a center plane 44-44 in an All Wrap Around (AWA) shield structure. There is a write gap 16 with thickness t on the MP trailing side, side gaps 15 adjoining each MP side, and a leading gap 13 below the MP leading side. Leading shield 11 contacts the leading gap and a bottom surface of side shields 12 at plane 42-42. Side shields (SS) have an inner side 12s adjoining a side gap, and far sides 60, 61 at an outer side of the AWA shield structure. The trailing shield (TS) structure comprises a first trailing shield hereinafter referred to as the write shield (WS) 17 with a magnetic saturation value from 19 kiloGauss (kG) to 24 kG, and with a bottom surface 17b on the WG except over a SIAMR stack of layers 2-6 each having a width ≤½ w on each side of the center plane. WS sides 17s are formed coplanar with WG sides 16s on each side of the center plane. The TS structure also includes a second TS 18 formed on the WS top surface and sides 17t and 17s, respectively, on WG sides 16s, and on a top surface of the side shields 12 at plane 41-41. Plane 4141 includes the MP trailing side at the ABS. Plane 4242 is parallel to plane 41-41, and includes the MP leading side at the ABS. Each of the SS, leading shield, TS structure, and MP are comprised of one or more of CoFe, NiFe, and CoFeNi.

According to a first embodiment of the present disclosure, the SIAMR stack of layers has a first spin killing (SK) layer 2, non-magnetic spacer 3, second SK layer 4, FM layer 5, and spin preserving (SP) layer 6 sequentially formed on MP trailing side 14t1. The SIAMR stack of layers has thickness t equivalent to that of WG layer 16 between plane 4141 and WS 17, and a width that is typically ≤w. Each SK layer is also known as a non-spin preserving layer and prevents spin polarized electrons from the FM layer from reaching the MP trailing side, and is preferably one of Ta, W, Pt, Ru, Ti, Ir, or Cr. The non-magnetic spacer is comprised of Ta, Ru, W, or Cr, and serves to improve the growth of the FM layer for better magnetic properties. The FM layer may be a single layer or multilayer that is comprised of one or more of Fe, Co, CoFe, NiFe, CoFeNi, and alloys thereof such as CoB, FeB, CoFeB, and CoFeNiB, or alloys with one or more of Ta, Zr, Re, and Mo. The SP layer is non-magnetic and comprises one or more of Cu, Au, Ag, Ru, Cr, and Al, and is responsible for having sufficient spin diffusion length to allow spin polarized electrons (not shown) to substantially remain in their original orientation while traversing from the FM layer to WS 17 (and to MP 14 in the fifth and sixth embodiments described later).

The first embodiment is a modification of the spin flipping element disclosed in related U.S. Pat. No. 10,325,618. We have discovered that by replacing a single SK layer with a stack comprised of a non-magnetic spacer 3 between two SK layers 2 and 4 in the SIAMR stack of layers, performance characteristics including electrical conductivity, thermal conductivity, electro-thermal robustness, and magnetic damping properties are simultaneously optimized.

Figure 6A:
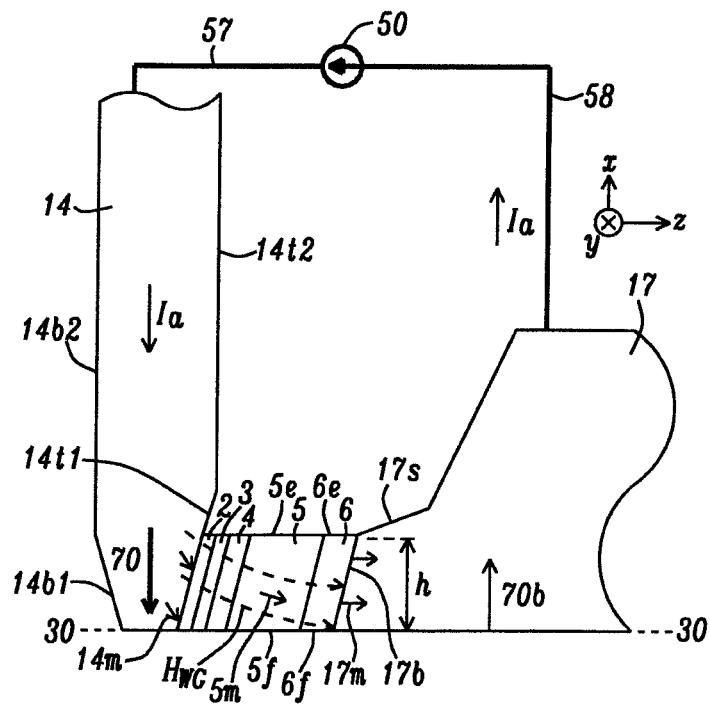
FIG. 6A is a down-track cross-sectional view of the SIAMR device in FIG. 5 where a current $I_a$ is applied from the MP and across the FM and SP layers to enhance a local WS magnetic field and WS return field.

Referring to FIG. 6A, a down-track cross-sectional view of the first embodiment is shown where the SIAMR stack of layers 2-6 is formed between MP 14 and WS 17. First SK layer 2 forms a first interface that is also referred to as the MP/SK interface with MP trailing side 14t1, and SP layer 6 forms a second interface also known as the SP/WS interface with WS bottom surface 17b. MP local magnetization 14m that is adjacent to the MP/SK interface is generally in the direction of the write gap field flux ($H_{WG}$), which is from the MP trailing side to WS bottom surface. There is also a local WS magnetization 17m adjacent to the SP/WS interface that is substantially parallel to $H_{WG}$, Moreover, FM layer 5 has magnetization 5m substantially parallel to $H_{WG}$, Other layers in the PMR writer are omitted in order to focus on the path of applied current $I_a$ while writing a transition where write field 70 is oriented downward at the ABS 30-30 and into a magnetic medium (not shown), and where return field 70b is orthogonal to the ABS and upward into the WS. In the exemplary embodiment, each of the SIAMR stack of layers has a front side at the ABS, and a backside at a WS throat height h where the WS bottom surface connects with WS side 17s. Thus, front sides 5f and 6f of the FM layer and SP layer, respectively, are coplanar, and FM layer backside 5e and SP layer backside 6e are at height h. Lead 57 carries $I_a$ into MP 14 from direct current (dc) source 50 while lead 58 carries $I_a$ back to the dc source from TS 17. In other embodiments (not shown), the SIAMR stack of layers may have a backside at a height unequal to h.

A key feature is that when $I_a$ flows from the MP 14 to WS 17, spin polarized current from FM layer 5 traverses the SP layer 6 and enters the WS, and produces a magnetization (not shown) proximate to the SP/WS interface that enhances local WS magnetization 17m and return field 70b. $I_a$ current density is less than required to flip FM magnetization 5m in STRAMR devices. Therefore, improved reliability is realized because of a reduced risk of electromigration within the SIAMR metal or alloy layers. During a transition (not shown) when the write field is orthogonal to the ABS 3030 and upward into the MP, and the directions of $I_a$, magnetizations 5m, 14m, and 17m, and return field 70b are reversed, there is no spin torque applied to local MP magnetization 14m because SK layers 2 and 4 prevent spin polarized electrons from reaching the MP.

Figure 6B:
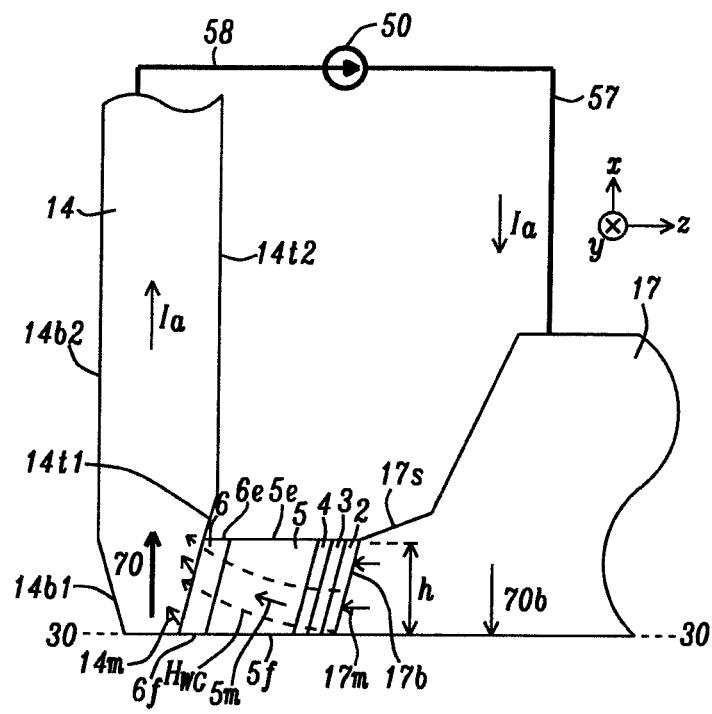
FIG. 6B is an alternative first embodiment where the stacking order of SIAMR device layers in FIG. 6A is reversed, and $I_a$ is applied from the TS and across the FM and SP layers to enhance a local MP magnetic field and write field.

An alternative first embodiment is depicted in FIG. 6B where the SIAMR layers are formed in reverse stacking order on MP trailing side 14t1 such that SP layer 6 adjoins the MP trailing side and forms a MP/SP interface while SK layer 2 contacts the WS bottom surface 17b and forms a SK/WS interface. This reverse SIAMR configuration is advantageous for boosting write field 70 during a transition when the write field is oriented orthogonal to the ABS 3030 and into the MP 14, and when $I_a$ is applied from the WS to MP. Here, local MP magnetization 14m, FM magnetization 5m, local WS magnetization 17m, and return field 70b are also opposite to the direction shown in FIG. 6A. In this case, spin polarized current from FM layer 5 traverses the SP layer and enters the MP to generate a magnetization adjacent to the MP trailing side that enhances the local MP magnetization 14m, and write field 70 that is in an upward direction. When the write field is reversed and $I_a$ is applied from the MP to WS, there is no spin torque produced on WS magnetization 17m because of the presence of SK layers 2, 4 that prevent spin polarized electrons from reaching WS bottom surface 17b.

Figure 7:
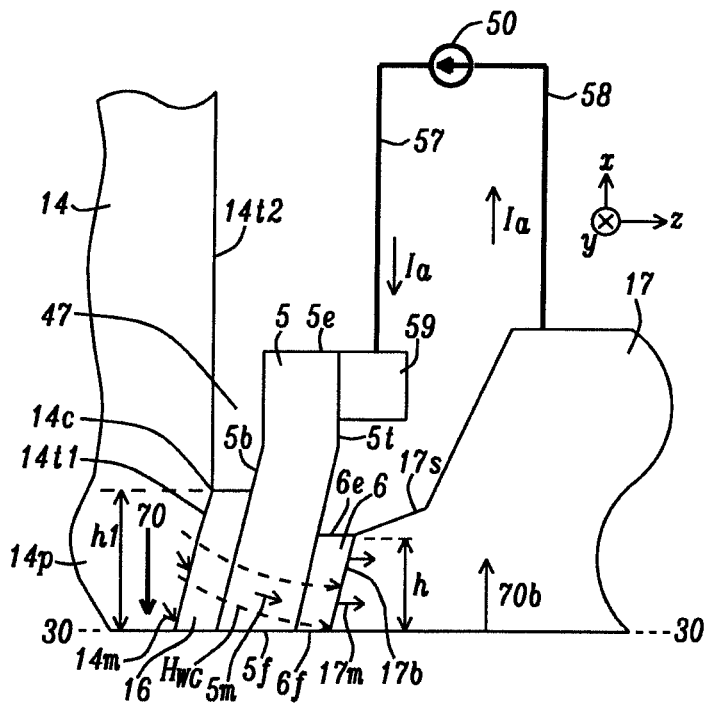
FIG. 7 is a down-track cross-sectional view where the spin killing layers in FIG. 6A are replaced with a dielectric layer and $I_a$ is injected into the FM layer and flows to the WS according to a second embodiment of the present disclosure.

Referring to FIG. 7, a second embodiment of the present disclosure is depicted and is a modification of the first embodiment where SK layers 2 and 4, and spacer 3 are replaced with WG layer 16 that is a dielectric material. Furthermore, current $I_a$ is injected through lead 57 and then into a contact 59 before entering the FM layer 5 since there is no longer a conductive pathway from MP 14 to the FM layer. The FM layer backside 5e is now at a height substantially greater than height h1 where the MP tapered trailing side 14t1 connects with MP top surface 14t2 at corner 14c. Thus, the FM layer has a bottom surface 5b that faces the MP and is separated from MP trailing side by WG layer 16, and from MP top surface by insulation layer 47, FM layer top surface 5t adjoins contact 59 proximate to end 5e. Otherwise, all aspects of the SP layer 6 are retained from the first embodiment in FIG. 6A including a front side 6f at the ABS 30-30, and a backside 6e at the WS TH, which is height h. Accordingly, spin polarized electrons from the FM layer traverse SP layer 6 and generate magnetization that enhances local WS magnetization 17m proximate to the SP/WS interface, and return field 70b when write field 70 is out of the MP and orthogonal to the ABS 30-30, and the return field is in an upward direction. Again, linear density and ADC are improved. When writing a transition where the write field, return field, $I_a$, and magnetizations 14m, 5m, and 17m are reversed, there is no enhancement to the write field because the WG layer prevents spin polarized electrons from reaching the MP trailing side.

Figure 8:
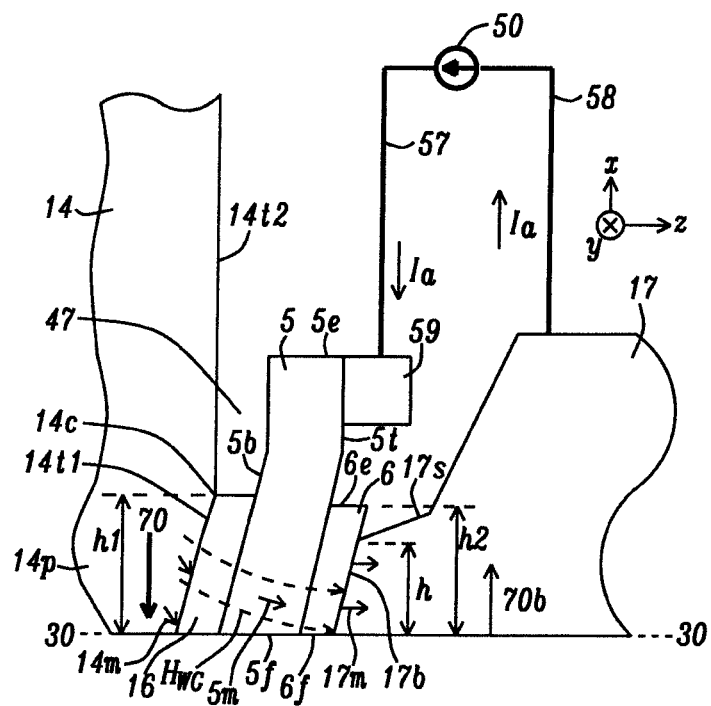
FIG. 8 is a down-track cross-sectional view depicting a third embodiment of the present disclosure wherein a backside of the SP layer in FIG. 7 is extended beyond a WS throat height (TH), and $I_a$ flows from the FM layer to WS.

Referring to FIG. 8, a third embodiment of the present disclosure is illustrated and is a modification of the second embodiment in FIG. 7 where SP layer backside 6e is extended farther from the ABS 30-30 to a height h2 where h2>h. The additional height of the SP layer 6 between front side 6f and backside 6e is expected to allow more spin polarized current from the FM layer 5 to the SPA/VS interface thereby generating greater magnetization to further enhance WS magnetization 17m and write field 70b (with the same current density in FM layer 5) compared with the SIAMR structure in FIG. 7. Optionally, less current density (same total current) in the FM layer produces an equal amount of magnetization to enhance WS magnetization and return field compared with previous embodiments to improve device reliability. Otherwise, all features and advantages of the second embodiment are retained in the third embodiment.

Figure 9:
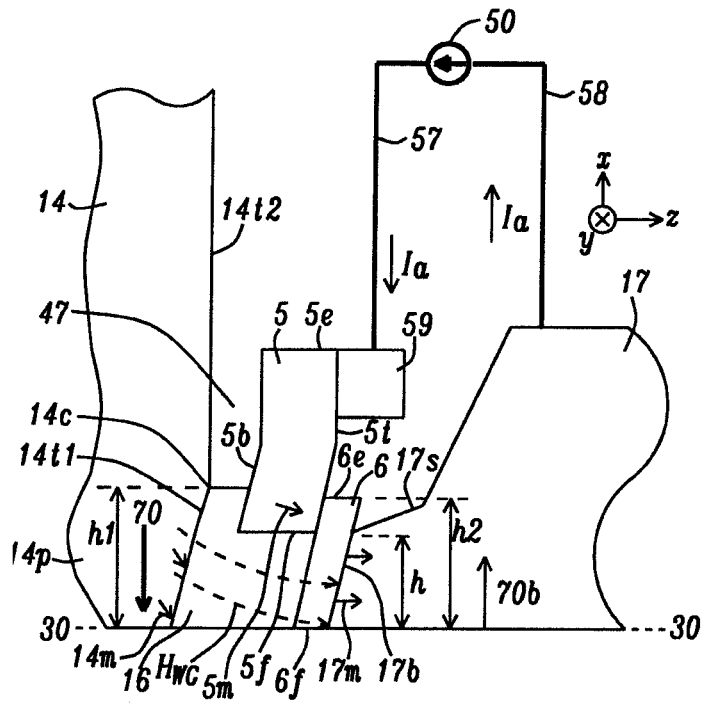
FIG. 9 is a down-track cross-sectional view of a fourth embodiment of the present disclosure wherein a front side of the FM layer in FIG. 8 is recessed to a WS throat height.

In FIG. 9, a fourth embodiment of the present disclosure is shown where the SIAMR structure in FIG. 8 is modified by recessing FM layer front side 5f to height h. Thus, WG layer 16 fills the entire space between the ABS 30-30 and FM layer front side, and SP layer 6 is the only SIAMR layer exposed at the ABS and in contact with WS 17. This design is expected to allow lower current density between the FM layer 5 and SP layer since this scheme allows a greater overlap of the aforementioned layers in the cross-track direction in embodiments where there is a larger WG cavity (not shown) at a height greater than h than between the ABS and the WS TH at height h. As a result, there is a significant improvement in reliability at the same performance compared with earlier embodiments where the write field 70 is in a downward direction out of the ABS, the return field 70b is upward from the ABS, and $I_a$ is from the FM layer and across the SP layer into the WS 17 to enhance local WS magnetization 17m and the return field.

Figure 10:
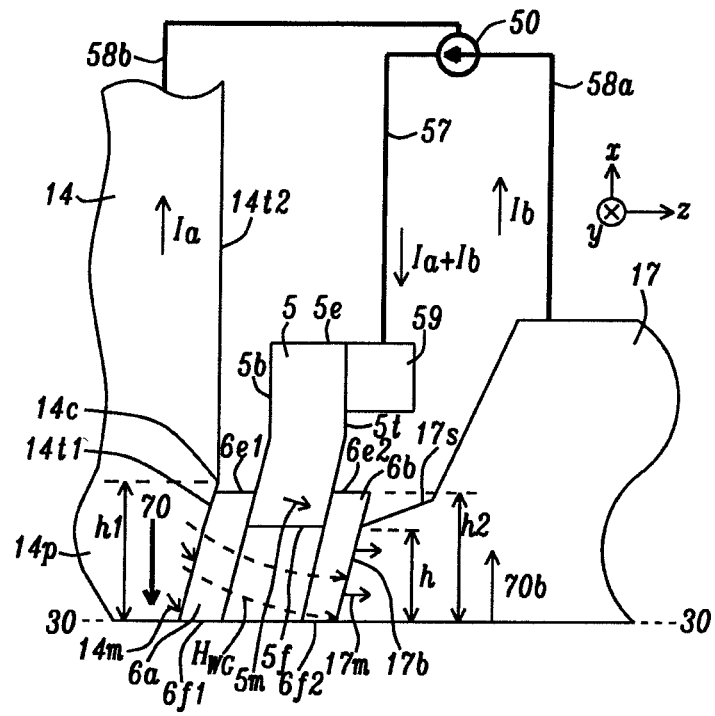
FIG. 10 is a down-track cross-sectional view of a fifth embodiment of the present disclosure wherein a second SP layer is inserted between the FM layer and MP trailing side in FIG. 9 so that spin polarized current from the FM layer flows through both of the first and second SP layers to the WS and MP, respectively.

Referring to FIG. 10, a fifth embodiment of the present disclosure is depicted and is a modification of the embodiment in FIG. 9 where a portion of the WG layer 16 adjoining MP trailing side 14t1 is replaced with a first SP layer (SP1) 6a having a backside 6e1 at height h2, and a front side 6f1 at the ABS 30-30. Thus, the SP1 forms a MP/SP1 interface with the MP trailing side, and adjoins a portion of FM layer bottom surface 5b, The second SP layer (SP2) 6b (former SP layer 6 in FIG. 9) contacts a portion of FM layer top surface 5t, and forms a SP2/WS interface with WS bottom surface 17b. The SP2 has a front side 6f2 at the ABS, and a backside 6e2 at height h2. There is a first return lead 58a between TS 17 and do source 50 that carries current $I_b$, and a second return lead 58b between MP 14 and the do source that carries $I_a$. In this embodiment, lead 57 is connected to contact 59, which injects ($I_a+I_b$) from the dc source to FM layer 5. In alternative embodiments (not shown) where the FM layer front side 5f is moved forward to the ABS, one or both of SP1 and SP2 backsides 6e1 and 6e2, respectively, may also be moved forward to height h, or maintained at height h2.

An advantage of the SIAMR layout in the fifth embodiment compared with previous embodiments is that write field 70 and return field 70b are simultaneously enhanced as a result of spin polarized current from FM layer 5 through SP1 6a and into MP tip 14p to generate magnetization (not shown) that enhances local MP magnetization 14m and the write field, and from the FM layer through SP2 6b and into WS 17 to produce magnetization that increases local WS magnetization 17m and the return field.

Note that the fifth embodiment provides similar benefits when the direction of the write field 70, return field 70b, and magnetizations 5m, 14m, and 17m are reversed (not shown) because $I_a$ and $I_b$ are maintained in the same direction. Thus, spin polarized electrons traversing through SP1 6a from FM layer 5 will continue to enhance local MP magnetization 14 and the write field, and spin polarized current through SP2 6b will continue to increase local WS magnetization 17m and the return field.

Figure 11:
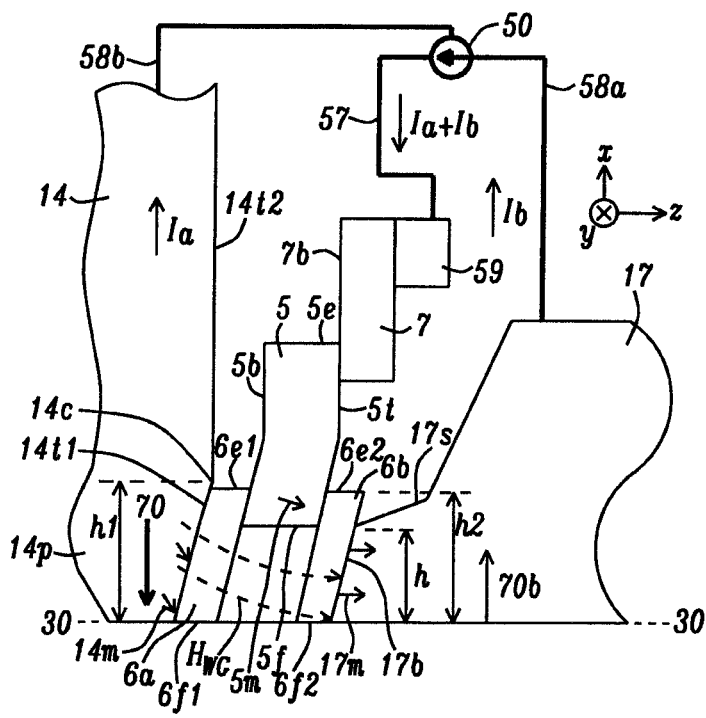
FIG. 11 is a down-track cross-sectional view showing a sixth embodiment of the present disclosure that is a modification of the fifth embodiment wherein the lead to the FM layer is stitched.

Referring to FIG. 11, a sixth embodiment of the present disclosure is shown that is a modification of the fifth embodiment where SP1 and SP2 front sides 6f1 and 6f2, respectively, as well as FM layer front side 5f are at the ABS 30-30, and where SP1 and SP2 backsides 6e1 and 6e2, respectively, are at height h2. A key feature is that lead 57 from the dc source 50 to FM layer 5 in FIG. 10 is now stitched and comprised of a SP material or spin killing material in stitched layer 7 having one end at contact 59, and an opposite end that overlaps a top surface 5t of the FM layer proximate to end 5e, Accordingly, a portion of stitched layer bottom surface 7b adjoins the FM layer top surface. The stitched lead is advantageously employed to reduce the lead resistance and thereby lower temperature in the SIAMR device to improve reliability. It should be understood that the lead modification described for the sixth embodiment may be applied to any of the second through fifth embodiments with similar benefits. In alternative embodiments (not shown) where the FM layer has a front side at the ABS, one or both of SP1 6a and SP2 6b may have a backside at height h.

Figure 12:
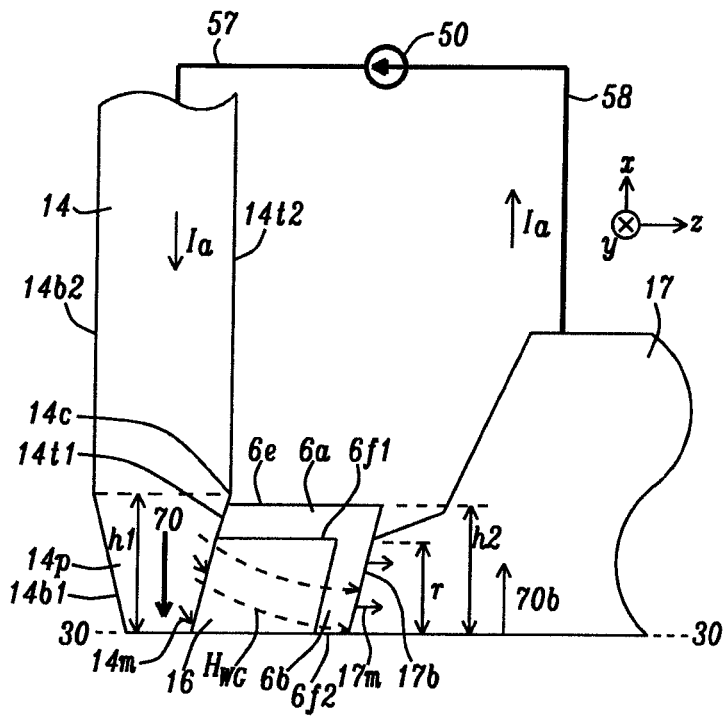
FIG. 12 is a down-track cross-sectional view depicting a seventh embodiment of the present disclosure wherein the FM layer in FIG. 9 is omitted, and the SP layer has a first portion adjoining the MP that has a recessed front side while a second portion of the SP layer contacting the WS has a front side at the ABS.

According to a seventh embodiment shown in FIG. 12, the SIAMR device in FIG. 7 is modified with the removal of FM layer 5 such that a single SP layer extends from the MP trailing side 14t1 to the WS bottom surface 17b. Thus, a first portion 6a of the SP layer has a recessed front side 6f1 at height r that may be proximate to the WS TH, a backside 6e at height h2, and forms a MP/SP interface with MP trailing side. Preferably, height r is from 1 nm to 20 nm and slightly larger than the effective throat height on the trailing shield, and h2 can be from 10 to 200 nm larger than r from the ABS 3040. In the exemplary embodiment, the MP trailing side connects with MP top surface 14t2 at corner 14c that is at height h1 from the ABS where h1>h2. A second portion 6b of the SP layer has backside 6e at height h2, a front side 6f2 at the ABS, adjoins first portion 6a between height r and height h2, and forms a SPANS interface with WS bottom surface 17b. The first portion of SP layer is recessed from the ABS so that local MP magnetization 14m proximate to the ABS is not reduced. Note that lead 57 now connects de source 50 with MP 14. Here, the MP proximate to the MP trailing side serves as the FM layer which spin polarizes $I_a$ that flows from the MP and across the SP layer and into the WS 17. Similar to previous embodiments, the spin polarized electrons produce a magnetization proximate to the WS bottom surface that enhances local WS magnetization 17m and return field 70b.

For all embodiments, the advantage of injecting spin polarized electrons from the FM layer across the SP layer and into one or both of the MP and WS generates magnetization at the MP/SP interface and SP/WS interface, respectively, that increases local magnetization at one or both of the interfaces and enhances one or both of the write field and return field depending on the direction of the current flow (except in the fifth and sixth embodiments). As a result, the PMR writer has improved performance based on greater linear density and higher ADC. Furthermore, a PMR writer having a SIAMR structure in the WG is expected to exhibit greater reliability because a lower current density for $I_a$ is required than in PMR writers employing a STRAMR device in the WG.

A process sequence for fabricating a magnetic flux guiding device in a WG and with a front side at the ABS has been described in related U.S. Pat. No. 10,424,326. A similar sequence of steps may be used to form a SIAMR stack of layers having a width w in a WG, and a backside at a WS TH as shown in the first embodiment.

Figure 13A:
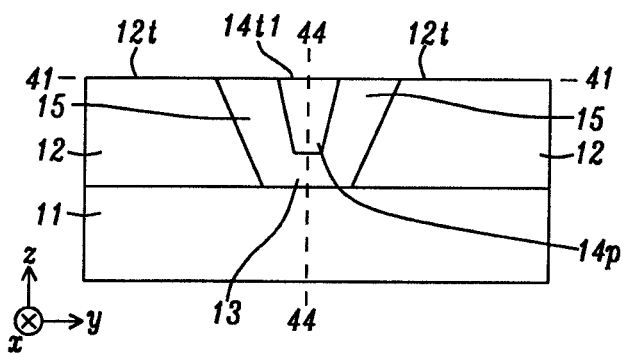
Figure 13B:
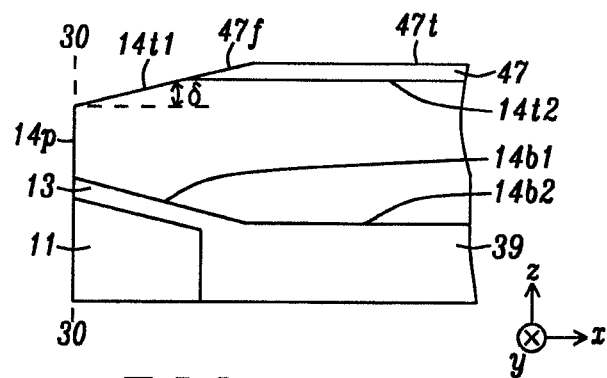
FIGS. 13B, 14B, and 16B are down-track cross-sectional views of the intermediate structures shown in FIGS. 13A, 14A, and 16A, respectively.

A process sequence for fabricating the SIAMR device of the second through fourth embodiments is illustrated starting at FIG. 13A. The partially formed writer structure including MP tip 14p that adjoins side gaps 15 and leading gap 13 is provided according to a conventional process sequence. Side shield top surfaces 12t are coplanar with a trailing edge of the MP tapered trailing side 14t1 at plane 41-41, which is slightly offset from being orthogonal to the subsequently formed ABS plane. FIG. 13B shows the down-track cross-sectional view at plane 44-44 in FIG. 13A. MP tapered trailing side 14t1 has a taper angle δ (generally greater than 0 degrees) and is coplanar with a tapered front side 47f of insulation layer 47 made of $Al_2O_3$ or $SiO_2$ that is formed on MP top surface 14t2. Tapered front side connects with dielectric layer top surface 47t that is above and essentially parallel to the MP top surface. Note that the eventual ABS, hereinafter referred to as ABS plane 30-30, is not determined until a lapping process is performed after all layers in the PMR writer structure are formed.

Figure 14A:
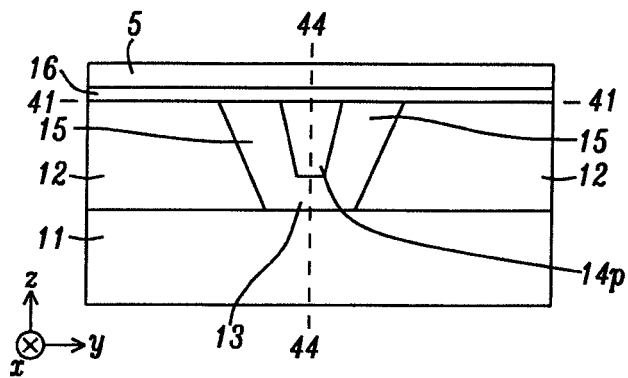
Figure 14B:
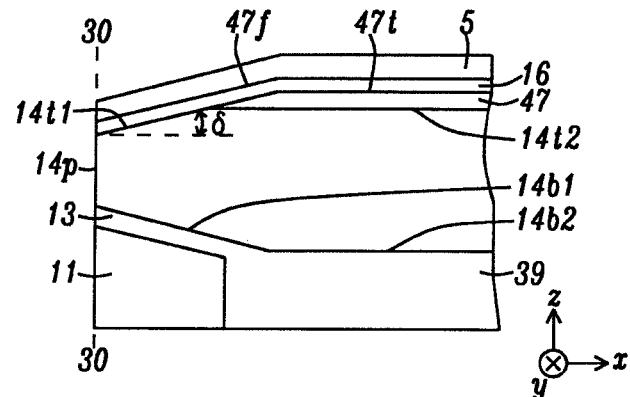

Referring to FIG. 14A, the next step in the fabrication process is sequential deposition of WG layer 16 and FM layer 5 on MP tapered trailing side 14t1. FIG. 14B shows that the WG layer and FM layer continue toward a back end of the writer structure and are also formed on insulation layer 47.

Figure 15:
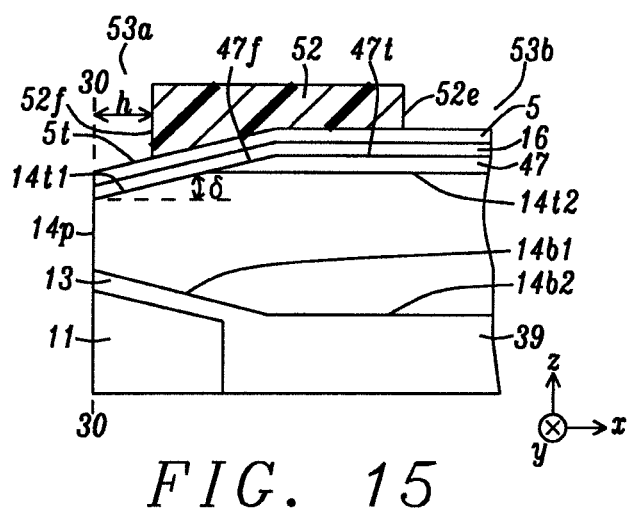
FIG. 15 is a down-track cross-sectional view showing the patterning of a FM layer.

As shown in FIG. 15, a first photoresist layer is coated on FM layer 5, and then exposed with the use of a chrome on quartz mask, for example, and developed with a photolithography process to form photoresist mask 52 having a front side 52f that is recessed to height h from the ABS plane 30-30 and thereby forming an opening 53a that exposes a portion of FM layer top surface 5t. Note that opening 53a may be omitted when forming a FM layer with a front side at the ABS as in the second and third embodiments. A second opening 53b is also formed during the photoresist patterning process. As a result, photoresist mask backside 52e is formed above MP top surface 14t2, and will be used to define a FM layer backside in a subsequent step.

Figure 16A:
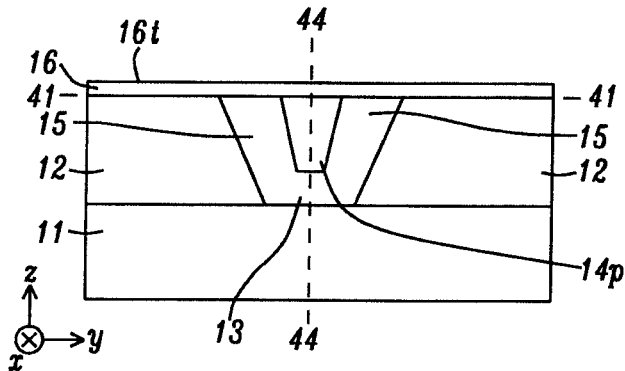
Figure 16B:
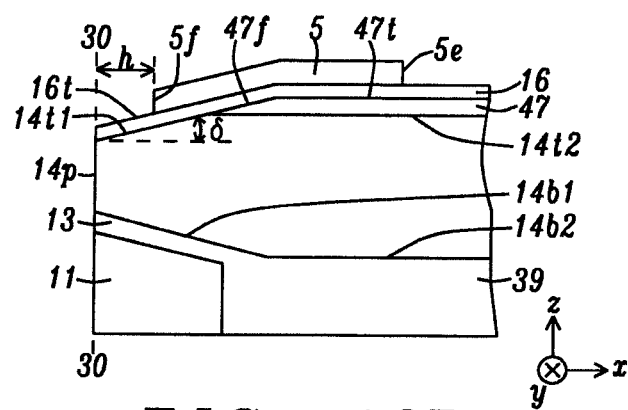

In FIG. 16A, an ABS view is shown after a reactive ion etch (RIE) or ion beam etch (IBE) process is employed to transfer openings 53a, 53b through the FM layer 5 and stop on WG layer top surface 16t. Thereafter, photoresist mask 52 is removed by a conventional method. FIG. 16B depicts a down-track cross-sectional view of the intermediate structure in FIG. 16A. The FM layer now has a front side 5f that is recessed to height h from the ABS plane 30-30, and a backside 5e above MP top surface 14t2.

Figure 17A:
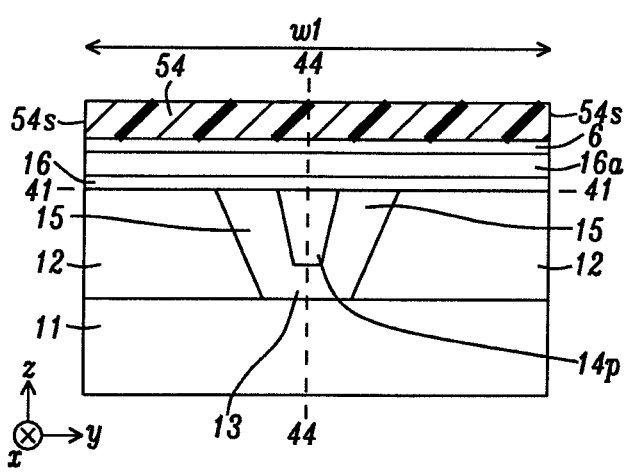

Referring to FIG. 17A, an additional WG layer 16a is optionally deposited on exposed portions of WG layer 16 between FM layer front side 5f and the ABS plane, and behind FM layer backside 5e. In the exemplary embodiment, the WG layers 16, 16a are made of the same dielectric material and shown hereinafter as a single WG layer 16. Then, SP layer 6 is deposited on the FM layer (not shown) and on the WG layer, A sputter deposition or ion beam deposition tool may be used to deposit each SIAMR layer including the FM layer 5 and SP layer. A second photoresist is coated and then exposed with the aid of another mask and developed by a photolithography process to yield photoresist mask 54 having a full width w1 between sides 54s that are coplanar with sides 60, 61 of the AWA shield structure described previously.

Figure 17B:
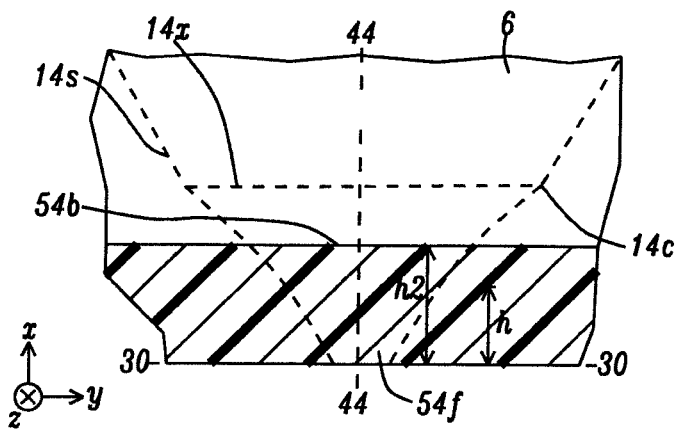
FIG. 17B is a top-down view of the intermediate structure shown in FIG. 17A that depicts a step of patterning a front portion of the SP layer according to an embodiment of the present disclosure.

FIG. 17B shows a top-down view of the intermediate structure in FIG. 17A where the underlying MP has sides indicated by the dashed line 14s. Dashed line 14x is between corners 14c and represents the interface where the MP tip portion 14p adjacent to the MP trailing side 14t1 meets the back portion of MP 14 below MP top surface 14t2. Corner 14c is also shown in a down-track cross-sectional view in FIG. 9. Returning to FIG. 17B, backside 54b of the second photoresist mask 54 is at height h2 where h2>h and will be used in a later step to define a backside of SP layer 6. Photoresist mask front side 54f may be at the ABS plane 30-30 or on an opposite side (not shown) of the ABS plane with respect to backside 54b.

Figure 18A:
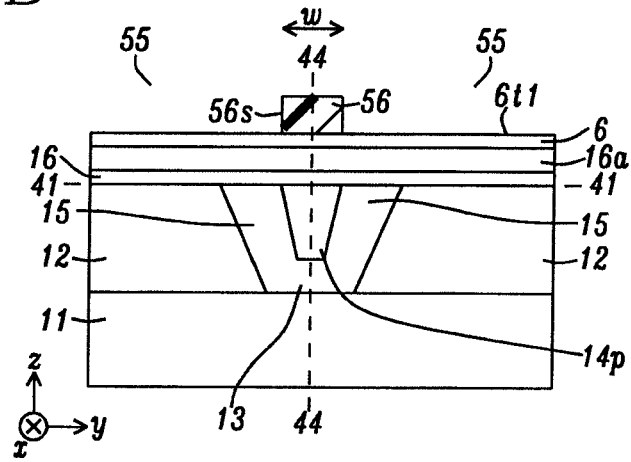
Figure 18B:
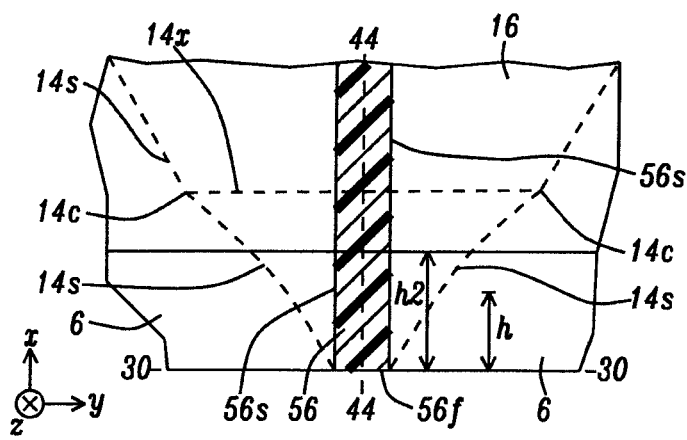
FIG. 18B is a top-down view of the intermediate structure in FIG. 18A that depicts a step of forming a cross-track width in the SIAMR stack of layers according to an embodiment of the present disclosure.

FIG. 18A depicts the intermediate structure in FIG. 17A after a RIE or IBE step is performed to transfer the shape in second photoresist mask 54 through exposed portions of SP layer 6 and stopping on FM layer 5 thereby forming a SP layer backside 6e at height h2 (FIG. 18B). The resulting opening (not shown) behind the SP layer is refilled with WG layer 16. The second photoresist mask is removed. Next, a third photoresist is coated and then exposed with a new mask and developed to form a third photoresist mask 56 having width w and sides 56s that are equidistant from center plane 4444. Openings 55 are formed that expose portions of SP layer top surface 6t1 at distances greater than ½ w from the center plane. Photoresist mask front side 56f may be on an opposite side of plane 30-30 than MP sides 14s since the ABS is not determined until a lapping process at the end of the fabrication sequence.

Figure 19:
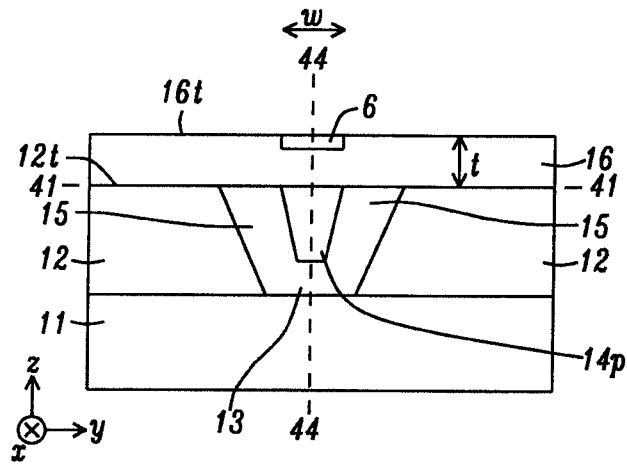

Referring to FIG. 19, a RIE or IBE process is performed to transfer openings 55 through exposed portions of WG layer 16, and FM layer 5 before stopping on SS top surface 12t and side gap 15 on each side of center plane 44-44. As a result, SP layer 6 has a constant width w from plane 30-30 to a backside (not shown) at height h2, and FM layer 5 has width w from front side that is at height h to a backside 5e described earlier. Thereafter, WG layer 16 is deposited on SS top surface and the side gap to thickness t. The third photoresist mask is removed with a conventional method.

Figure 20:
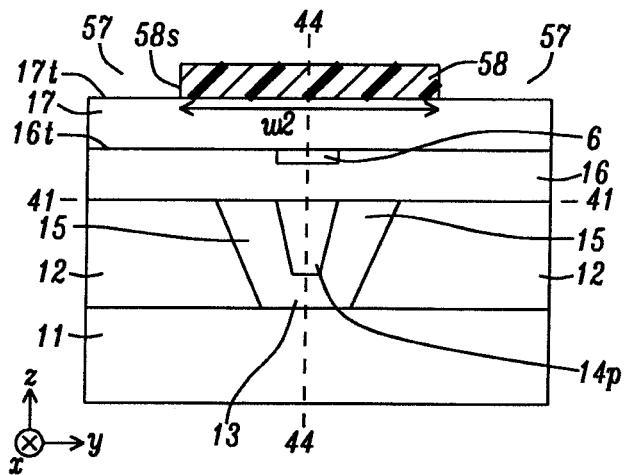

Referring to FIG. 20, WS 17 is deposited on WG layer 16 and on SP layer 6. Next, a fourth photoresist layer is coated on the WS and is exposed with a fourth mask and developed to generate a fourth photoresist mask 58 having width w2 where w2>w, and sides 58s that are equidistant from center plane 44-44. Openings 57 adjacent to sides 58s expose a portion of WS top surface 17t.

Figure 21:
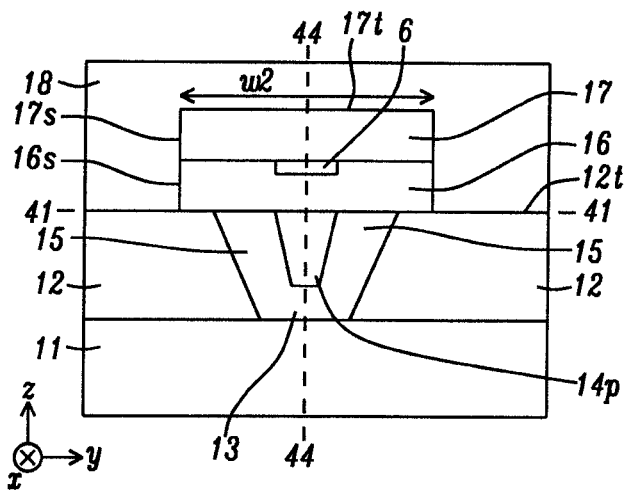

FIG. 21 depicts the intermediate structure in FIG. 20 after a RIE or IBE is performed to transfer openings 57 through WS 17 and WG layer 16, and stopping on SS top surface 12t. After the fourth photoresist mask is removed with a conventional process, the second TS 18 is plated on SS top surface 12t, WS top surface 17t, and adjoins WG sides 16s and WS 17s. Thereafter, a well known sequence of steps is followed to form overlying layers in the PMR writer. Finally, a lapping step is used to form the ABS at plane 30-30 described previously.

While the present disclosure has been particularly shown and described with reference to, the preferred embodiments thereof, it will be understood by those skilled in the art that various changes in fora and details may be made without departing from the spirit and scope of this disclosure.

I claim:

1. A spin injection assisted magnetic recording (SIAMR) structure, comprising:
   (a) a main pole (MP) that is configured to generate a magnetic (write) field which is directed orthogonal to an air bearing surface (ABS) and through a MP tip at the ABS;
   (b) a write shield (WS) with a side at the ABS through which a return field passes orthogonal to the ABS, and having a bottom surface that faces a MP trailing side; and
   (c) a SIAMR stack of layers formed in a write gap (WG) wherein a first layer contacts the WS bottom surface, and a second layer contacts the MP trailing side, wherein the SIAMR stack of layers comprises:
      (1) a ferromagnetic (FM) layer having a magnetization substantially in a direction of a WG field flux between the MP and WS;
      (2) a spin preservation (SP) layer that adjoins a first side of the FM layer, and is either the first layer that conducts spin polarized current from the FM layer into the WS at the WS bottom surface, or is the second layer that conducts spin polarized current from the FM layer into the MP trailing side, and wherein the SIAMR stack of layers is configured so that when a current (Ia) is injected from a source into the FM layer, spin polarized electrons flow across the SP layer to generate a magnetization proximate to the MP trailing side that enhances a local MP magnetization and the write field when the SP layer is the second layer, or produces a magnetization proximate to the WS bottom surface that enhances a local WS magnetization and the return field when the SP layer is the first layer; and
      (3) the other of the first layer or second layer that comprises a stack of layers wherein a non-magnetic spacer is sandwiched between two conductive spin killing (non-spin preserving) layers, and contacts a second side of the FM layer opposite to the FM layer first side.

2. The SIAMR structure of claim 1 wherein the MP is connected through a first lead to the source that is a direct current (dc) source, and the WS is connected through a second lead to the dc source.

3. The SIAMR structure of claim 1 wherein the FM layer is a single layer or multilayer comprised of one or more of Fe, Co, CoFe, NiFe, CoFeNi, and alloys thereof including CoB, FeB, CoFeB, and CoFeNiB, or alloys with one or more of Ta, Zr, Re, and Mo.

4. The SIAMR structure of claim 1 wherein the SP layer is one or more of Cu, Au, Ag, Ru, Cr, and Al.

5. The SIAMR structure of claim 1 wherein each of the conductive spin killing layers is one of Ta, W, Pt, Ru, Ir, Cr, or Ti.

6. The SIAMR structure of claim 1 wherein each of the FM layer, the SP layer, and the other of the first and second layer has a front side at the ABS, and a backside at a WS throat height.

7. A head gimbal assembly (HGA), comprising:
   (a) a magnetic recording head that comprises the SIAMR structure of claim 1; and
   (b) a suspension that elastically supports the magnetic recording head, wherein the suspension has a flexure to which the magnetic recording head is joined, a load beam with one end connected to the flexure, and a base plate connected to the other end of the load beam.

8. A magnetic recording apparatus, comprising:
   (a) the HGA of claim 7;
   (b) a magnetic recording medium positioned opposite to a slider;
   (c) a spindle motor that rotates and drives the magnetic recording medium; and
   (d) a device that supports the slider, and that positions the slider relative to the magnetic recording medium.

* * * * *